United States Patent Office 3,776,910
Patented Dec. 4, 1973

3,776,910
PRODUCTION OF 5-(1',3'-DIAZACYCLOALK-2'-ENYL)-OXDIAZOLES-(1,2,4)
Helmut Hagen, Frankenthal, Friedrich Becke, Heidelberg, and Juergen Niemeyer, Gruenstadt, Germany, assignors to Badische Anilin- & Soda-Fabrik Aktiengesellschaft, Ludwigshafen (Rhine), Germany
No Drawing. Filed Mar. 18, 1971, Ser. No. 125,900
Int. Cl. C07d 51/28
U.S. Cl. 260—256.4 H     4 Claims

ABSTRACT OF THE DISCLOSURE

The production of 5-(1',3'-diazacycloalk-2'-enyl)-oxidazoles-(1,2,4) by reaction of 5-halomethyloxdiazoles with diaminoalkanes and elementary sulfur, and the novel 5-(1',3'-diazacycloalk-2'-enyl)-oxidazoles-(1,2,4) themselves. The compounds of the invention have hypotensive action and are assistants for the textile industry, plant protection agents and valuable starting materials for the production of plant protection agents, pharmaceuticals and dyes.

---

The invention relates to a process for the production of 5-(1',3'-diazacycloalk-2'-enyl)-oxidazoles-(1,2,4) by reaction of 5-halomethyloxdiazoles with diaminoalkanes and elementary sulfur.

It is an object of the invention to provide a novel process for producing 5-(1',3'-diazacycloalk-2'-enyl)-oxidazoles-(1,2,4) in good yields and purity.

Another object is the new 5-(1',3' - diazacycloalk-2'-enyl)-oxidazoles-(1,2,4).

We have found that 5-(1',3' - diazacycloalk - 2' - enyl)-oxidazoles-(1,2,4) having the general formula (I):

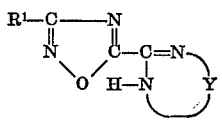

(I)

where $R^1$ denotes an aliphatic, cycloaliphatic, araliphatic or aromatic radical or the radical:

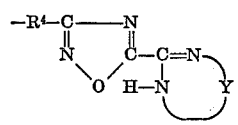

where $R^4$ denotes an aliphatic radical, Y denotes the radical

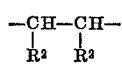

the radical

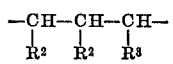

or the radical

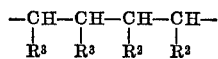

the individual radicals $R^2$ and $R^3$ may be identical or different and each denotes a hydrogen atom or an aliphatic radical, moreover the two radicals $R^2$ and/or the two radicals $R^3$ together with the two adjacent carbon atoms may denote members of a ring, are advantageously obtained by reacting a 5-halomethyloxdiazole-(1,2,4) having the General Formula II:

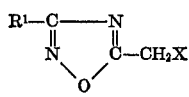

(II)

in which $R^1$ has the above meanings and X denotes a halogen atom, with a diaminoalkane having the General Formula III:

$$H_2N-Y-NH_2 \qquad (III)$$

in which Y has the above meanings and with elementary sulfur.

When 3-phenyl - 5 - chloromethyloxdiazole - (1,2,4) and ethylene diamine are used, the reaction may be represented by the following formulae:

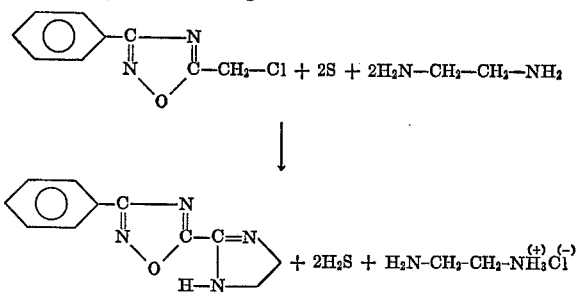

The process according to the invention gives a large number of hitherto unknown 5-(1',3'-diazacycloalk-2'-enyl)-oxidazoles-(1,2,4) in good yields and purity.

The starting materials (II) can easily be prepared by conventional methods, for example according to the process described in Ber., 17 1685 (1884) by reaction of amidoximes with chloroacetic anhydride. Starting material (II) is as a rule related with starting material (III) and elementary sulfur in stoichiometric amounts. Starting material (III) and/or sulfur may however be used in excess, for example up to 1.5 times the stoichiometric amount, based on starting material (II). An appropriate amount of another acid-binding agent may also be used instead of the portion of starting material (III) which binds the hydrohalide liberated. Examples of suitable acid-binding agents are tertiary amines, inorganic bases such as alkali metal or alkaline earth metal oxides, hydroxides, amides or alcoholates or salts of weak or polybasic acids.

Preferred 5 - halomethyloxdiazoles (II), 1,2 - diaminoalkanes, 1,3-diaminoalkanes and 1,4 - diaminoalkanes (III) and consequently preferred end products (I) are those in whose formulae $R^1$ denotes an alkyl radical having one to twenty, particularly one to six, carbon atoms, a cycloalkyl radical having three to eight carbon atoms, an aralkyl radical having seven to twelve carbon atoms, an unsubstituted or substituted phenyl or naphthyl radical or the radical:

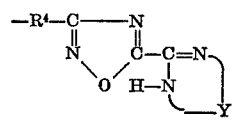

in which $R^4$ denotes an alkylene radical having two to eight carbon atoms, and Y denotes the radical

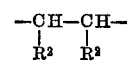

the radical

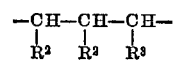

or the radical

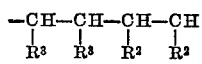

The individual radicals $R^2$ and $R^3$ may be identical or different and each may denote a hydrogen atom or an alkyl radical having one to three carbon atoms. In each case the two radicals $R^2$ and/or the two radicals $R^3$ together with the two adjacent carbon atoms denote a five-membered or six-membered cycloaliphatic ring, and X preferably denotes a bromine, iodine or particularly a chlorine atom. The said radicals and rings may bear (as substituents) groups and/or atoms which are inert under the reaction conditions, for example alkoxy or alkyl groups, in each case having one to four carbon atoms, or chlorine atoms on the phenyl or naphthyl radicals.

The following are examples of starting materials (II) which may be used:

3-phenyl-5-chloromethyloxdiazole-(1,2,4),
3-chlorophenyl-5-chloromethyloxdiazole-(1,2,4),
3-(2'-methyl-4'-chlorophenyl)-5-chloromethyloxdiazole-(1,2,4),
3-α-naphthyl-5-chloromethyloxdiazole-(1,2,4),
3-cyclohexyl-5-chloromethyloxdiazole-(1,2,4),
3-isobutyl-5-chloromethyloxdiazole-(1,2,4),
3-benzyl-5-chloromethyloxdiazole-(1,2,4),
3-(4'-ethoxyphenyl)-5-chloromethyloxdiazole-(1,2,4),
3-(β-ethylhexyl)-5-chloromethyloxdiazole-(1,2,4),
3,3'-tetramethylenebis-(5,5'-chloromethyloxdiazole-(1,2,4), and the analogous 3,3'-hexamethylene derivative; and corresponding
5-bromomethyl and 5-iodomethyl compounds.

Examples of starting materials (III) are: 1,2-diaminoethane, 1,2-diaminopropane, 1,2-diaminocyclohexane, 1,2-diaminocyclopentane, 3,4-diaminohexane, 2,3-diaminobutane, 1,3-diaminopropane, 1,3-diaminobutane, 1,3-diamino-2-ethylhexane, 2-aminocyclohexylamine, 2-aminocyclopentylamine, 2 - aminomethylcyclohexylamine, 2-aminomethylcyclopentylamine, 1,4-diaminobutane, 1,4-diamino-2-ethylhexane, 1,4-diamino-1,2,3,4-tetramethylbutane, 2-aminoethylcyclohexylamine and 2-aminoethylcyclopentylamine.

The reaction is carried out as a rule at a temperature of from 40° to 160° C., preferably at from 60° to 120° C., at atmospheric or superatmospheric pressure, continuously or batchwise. It is advantageous to use an organic solvent which is inert under the reaction conditions, for example an aromatic hydrocarbon such as benzene or toluene; an alkanol such as methanol, ethanol, propanol or butanol; or a cyclic ether such as dioxane. It is preferred to use a ratio of from 3 to 20 moles of solvent per mole of starting material (II).

The reaction may be carried out as follows: a mixture of starting material (II) and sulfur with or without a solvent has added to it at the reaction temperature the starting material (III) within one hour to three hours. The mixture is then allowed to react for another four to twelve hours until the evolution of hydrogen sulfide has ended. The end product is then separated by a conventional method, for example by filtration of the mixture, cooling the filtrate followed by crystallization or by distilling off the solvent and crystallization.

The new compounds which can be prepared by the process according to the invention have hypotensive action and are assistants for the textile industry, plant protection agents and also valuable starting materials for the production of plant protection agents, pharmaceuticals and dyes. Thus for example an antistatic finish may be given therewith to synthetic fibrous material, for example of polyester or polyamide fibers. Furthermore when used in an amount of from 5 to 50 grams per kg. of fibrous material and applied by conventional methods, the said substances not only impart an antistatic effect, but also a soft or firm handle depending on the constitution of the substance. For example polyester piece goods may be impregnated with an aqueous liquor of the said concentration at a temperature of from 15° to 40° C. and dried.

The following examples illustrate the invention. The parts given in the examples are parts by weight.

EXAMPLE 1

49 parts of 3-phenyl-5-chloromethyloxadiazole-(1,2,4) and 16 parts of sulfur are heated to 70° C. in 500 parts of benzene in a stirred vessel. 37 parts of 1,2-diaminopropane is introduced into this mixture within an hour. The reaction mixture is then kept at refluxing temperature until the end of the evolution of hydrogen sulfide (about ten hours). The hot benzene phase is decanted off from the diamino hydrochloride, filtered while hot and cooled. A pale yellow solid is precipitated after some time; it is suction filtered and recrystallized from a mixture of benzene and ligroin. 48 parts of 3-phenyl-5-[(4-methyl) - 3 - imidazolinyl]-oxdiazole-(1,2,4) is obtained having a melting point of 133° to 134° C. This is equivalent to a yield of 85% of the theory, based on 3-phenyl-5-chloromethyloxdiazole-(1,2,4).

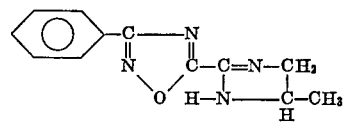

EXAMPLE 2

49 parts of 3-phenyl-5-chloromethyloxdiazole-(1,2,4) and 16 parts of sulfur is reacted with 33 parts of ethylenediamine in 400 parts of toluene as described in Example 1. 42 parts of 3-phenyl-5-(2-imidazolinyl)-oxdiazole-(1,2,4) is obtained having a melting point of 138° to 139° C. (recrystallized from alcohol). This is equivalent to a yield of 79% of the theory.

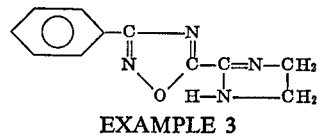

EXAMPLE 3

As described in Example 1, 49 parts of 3-phenyl-5-chloromethyloxdiazole-(1,2,4) is reacted with 16 parts of sulfur and 57 parts of 1,2-diaminocyclohexane in 500 parts of benzene. After the benzene phase has been concentrated and the product recrystallized from ligroin, 38 parts of 3-phenyl-5-(2-hexahydrobenzimidazolyl)-oxdiazole-(1,2,4) is obtained having a melting point of 102° to 104° C. The yield is equivalent to 57% of the theory.

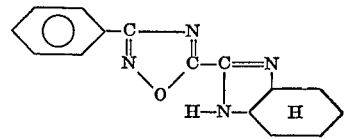

EXAMPLE 4

42 parts of 3-benzyl-5-chloromethyloxidazole-(1,2,4) is reacted with 13 parts of sulfur and 26 parts of ethylenediamine in 500 parts of benzene in a stirred vessel. After working up in a manner analogous to that described in Example 1, 32 parts of 3-benzyl-5-(2-imidazolnyl)-oxidazole-(1,2,4) is obtained which has a melting point of 114° C. (recrystallized from methanol). This is equivalent to a yield of 70% of the theory.

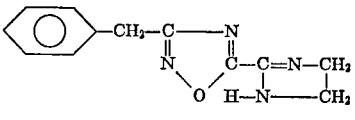

EXAMPLE 5

57 parts of 3-(3-chlorophenyl)-5-chloromethyloxidazole-(1,2,4) is reacted in a stirred apparatus with 16 parts of sulfur and 33 parts of ethylenediamine in 500 parts of toluene as solvent. After working up analogously to Example 1, 48 parts of 3-(3-chlorophenyl)-5-(2-imidazolinyl)-oxidazole-(1,2,4) is obtained which has a melting point of 163° to 164° C. (recrystallized from alcohol). This is equivalent to a yield of 68% of the theory.

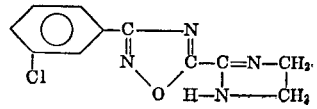

EXAMPLE 6

61 parts of 3-(2-methyl-4-chlorophenyl)-5-chloromethyloxidazole-(1,2,4) is reacted in a stirred vessel with 16 parts of sulfur and 33 parts of ethylenediamine in 400 parts of toluene as described in Example 1. 59 parts of 3 - (2 - methyl-4-chlorophenyl)-5-(2-imidazolinyl)-oxdiazole-(1,2,4) is obtained which has a melting point of 161° to 162° C. (recrystallized from alcohol). The yield is equivalent to 90% of the theory.

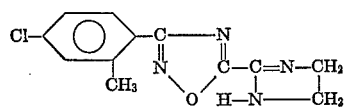

EXAMPLES 7

58 parts of 3,3'-tetramethylene-bis-(5,5'-chloromethyloxdiazole-(1,2,4)) is reacted in a stirred vessel with 26 parts of sulfur and 52 parts of ethylenediamine in 500 parts of toluene analogously to Example 1. 40 parts of 3,3' - tetramethylenebis-(5,5'-(2-imidazolinyl)-oxdiazole-(1,2,4) is obtained having a melting point of 201° to 202°. C. The yield is equivalent to 71% of the theory

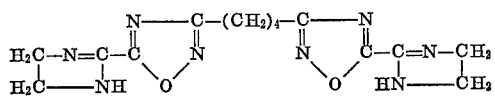

EXAMPLE 8

32 parts of 3,3'-hexamethylenebis-(5,5'-chloromethyloxdiazole-(1,2,4)) is reacted with 13 parts of sulfur and 27 parts of ethylenediamine in 500 parts of toluene. 26 parts of 3,3' - hexamethylenebis-(5,5'-(2-imidazolinyl)-oxdiazole-(1,2,4)) is obtained having a melting point of 167° to 168° C. This is equivalent to a yield of 72% of the theory

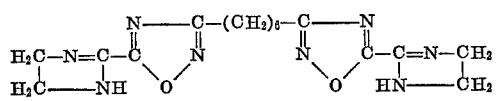

EXAMPLE 9

As described in Example 1, 37 parts of 3-(α-naphthyl)-5-chloromethyloxdiazole-(1,2,4) is reacted with 10 parts of sulfur and 23 parts of 1,2-diaminepropane in 500 parts of benzene. 28 parts of 3-(α-naphthyl)-5-(2-(4-methyl)-imidazolinyl)-oxdiazole-(1,2,4) is obtained having a melting point of 145° to 147° C. The yield is equivalent to 67% of the theory.

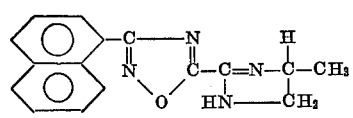

EXAMPLE 10

40 parts of 3-cyclohexyl-5-chloromethyloxdiazole-(1,2,4) is reacted with 13 parts of sulfur and 27 parts of ethylenediamine in 500 parts of benzene. 40 parts of 3-cyclohexyl-5-(2-imidazolinyl) - oxidazole - (1,2,4) is obtained having a melting point of 128° to 129° C. (recrystallized from cyclohexane). This is equivalent to a yield of 91% of the theory.

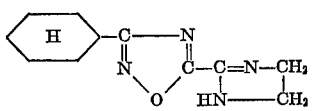

EXAMPLE 11

40 parts of 3-cyclohexyl-5-chloromethyloxdiazole-(1,2,4) is reacted with 13 parts of sulfur and 30 parts of 1,2-diaminopropane in 500 parts of benzene. 36 parts of 3 - cyclohexyl - 5-(2-(4-methyl)-imidazolinyl)-oxdiazole-(1,2,4) is obtained having a melting point of 64° to 66° C. (recrystallized from ligroin). This is equivalent to a yield of 77% of the theory

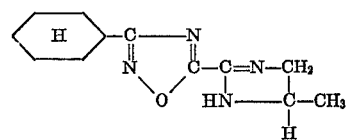

EXAMPLE 12

49 parts of 3-phenyl-5-chloromethyloxdiazole-(1,2,4) and 16 parts of sulfur are heated in 400 parts of benzene in a stirred apparatus to 70° C. 38 parts of 1,3-diaminopropane is introduced into this mixture within one hour. The reaction mixture is then kept at refluxing temperature until the end of the evolution of hydrogen sulfide (twelve hours). The benzene phase is decanted off from diamino hydrochloride, filtered while hot and cooled. The deposited end product is suction filtered and recrystallized from a mixture of benzene and ligroin. 43 parts of 3-phenyl-5-(2-tetrahydropyrimidinyl)-oxdiazole-(1,2,4) is obtained as colorless needles having a melting point of 160° C. This is equivalent to a yield of 75% of the theory.

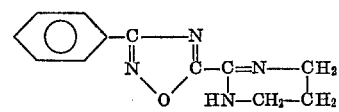

EXAMPLE 13

49 parts of 3-phenyl-5-chloromethyloxdiazole-(1,2,4) and 16 parts of sulfur are reacted in a stirred apparatus in 400 parts of benzene as described in Example 12 with 57 parts of 2-aminomethylcyclopentylamine. 55 parts of 3-phenyl-5-(2'-(4',5'-trimethylene)-tetrahydropyrimidinyl)-oxdiazole-(1,2,4) is obtained having a melting point of 113° to 115° C. (recrystallized from ligroin). The yield is equivalent to 82% of the theory.

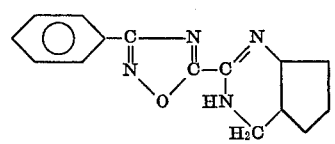

EXAMPLE 14

42 parts of 3-benzyl-5-chloromethyloxdiazole-(1,2,4) is reacted in a stirred apparatus with 13 parts of sulfur and 30 parts of 1,3-diaminopropane in 400 parts of benzene. After working up as in Example 12, 38 parts of 3-benzyl-5-(tetrahydropyrimidinyl) - oxdiazole - (1,2,4) is obtained which has a melting point of 124° C. This is equivalent to a yield of 78% of the theory.

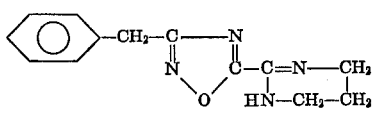

EXAMPLE 15

42 parts of 3-benzyl-5-chloromethyloxdiazole-(1,2,4) is reacted as described in Example 12 with 13 parts of sulfur and 42 parts of 2-aminomethylcyclopentylamine in 400 parts of benzene. The benzene phase is concentrated and the product is recrystallized from ligroin. 36 parts of 3-benzyl-5-(2'-(4',5'-trimethyl)-tetrahydropyrimidinyl) - oxdiazole-(1,2,4) is obtained having a melting point of 80° to 82° C. The yield is equivalent to 64% of the theory.

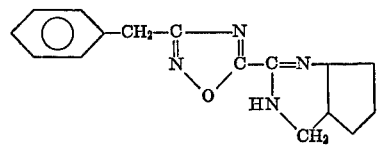

EXAMPLE 16

As described in Example 12, 49 parts of 3-naphthyl-5-chloromethyloxdiazole-(1,2,4) is reacted with 13 parts of sulfur and 30 parts of 1,3-diaminopropane in 500 parts of benzene. 41 parts of 3-(α-naphthyl)-5-(2'-tetrahydropyrimidinyl)-oxdiazole-(1,2,4) is obtained having a melting point of 83° to 186° C. The yield is equivalent to 74% of the theory.

EXAMPLE 17

40 parts of 3-cyclohexyl-5-chloromethyloxdiazole-(1,2,4) and 13 parts of sulfur in 400 parts of benzene are reacted in a stirred apparatus with 30 parts of 1,3-diaminopropane as in Example 12. 37 parts of 3-cyclohexyl-5-(2'-tetrahydropyrimidinyl)-oxdiazole-(1,2,4) is obtained having a melting point of 113° C. This is equivalent to a yield of 79% of the theory.

EXAMPLE 18

40 parts of 3-cyclohexyl-5-chloromethyloxdiazole-(1,2,4) and 13 parts of sulfur are reacted with 46 parts of 2-aminomethylcyclopentylamine in 400 parts of benzene. 38 parts of 3-cyclohexyl-5-(2'-(4',5'-trimethylene)-tetrahydropyrimidinyl)-oxdiazole-(1,2,4) is obtained as a viscous liquid. The yield is equivalent to 69% of the theory. The melting point of the hydrochloride is 206° to 207° C. (with decomposition).

EXAMPLE 19

49 parts of 3-phenyl-5-chloromethyloxidazole-(1,2,4) and 16 parts of sulfur are heated in 400 parts of benzene to 70° C. in a stirred apparatus. 44 parts of 1,4-diaminobutane is introduced into this mixture within one hour. The reaction mixture is then kept at refluxing temperature until the end of the evolution of hydrogen sulfide (about ten hours). The benzene phase is decanted off from the diamino hydrochloride, filtered while hot and concentrated. The residue obtained is recrystallized from cyclohexane. 48 parts of 3-phenyl-5-(1',3'-diazacyclohept-2'-enyl)-oxdiazole-(1,2,4) is obtained having a melting point of 122° to 123° C. This is equivalent to a yield of 69% of the theory.

EXAMPLE 20

42 parts of 3-benzyl-5-chloromethyloxidazole-(1,2,4) is reacted in a stirred apparatus with 13 parts of sulfur and 35 parts of 1,4-diaminobutane in 400 parts of benzene. After working up as in Example 1, 43 parts of 3-benzyl-5-(1',3'-diazacyclohept-2'-enyl)-oxidazole-(1,2,4) is obtained having a melting point of 74° to 76° C. (recrystallization from ligroin). This is equivalent to a yield of 84% of the theory.

EXAMPLE 21

37 parts of 3-(α-naphthyl)-5-chloromethyloxidazole-(1,2,4) is reacted with 10 parts of sulfur and 27 parts of 1,4-diaminobutane in 400 parts of benzene as described in Example 1. The benzene phase is concentrated and the product is recrystallized from ligroin. 33 parts of 3-((α-naphthyl)-5-(1',3'-diazacyclohept-2'-enyl)-oxidazole-(1,2,4) is obtained having a melting point of 106° to 108° C. The yield is equivalent to 75% of the theory.

EXAMPLE 22

40 parts of 3-cyclohexyl-5-chloromethyloxidazole-(1,2,4) and 13 parts of sulfur are reacted in 400 parts of benzene in a stirred apparatus with 36 parts of 1,4-diaminobutane as described in Example 1. 40 parts of 3-cyclohexyl-5-(1',3'-diazacyclohept-2'-enyl)-oxdiazole-(1,2,4) is obtained. The yield is equivalent to 80% of the theory.

EXAMPLE 23

49 parts of 3-(2-methyl-4-chlorophenyl)-4-chloromethyloxidazole-(1,2,4) and 13 parts of sulfur are reacted in 400 parts of benzene in a stirred apparatus with 36 parts of 1,4-diaminobutane as described in Example 1. The benzene phase is decanted off from the diamino hydrochloride, filtered while hot and cooled. The end product is suction filtered and recrystallized from ethanol. 46 parts of 3-(2-methyl-4-chlorophenyl)-3-(1',3'-diazacyclohept-2'-enyl)-oxdiazole-(1,2,4) is obtained having a melting point of 160° to 161° C. The yield is equivalent to 79% of the theory.

EXAMPLE 24

As described in Example 5, 52 parts of 3-(4-methylphenyl)-5-chloromethyloxidazole-(1,2,4) is reacted with 16 parts of sulfur and 44 parts of 1,4-diaminobutane in 400 parts of benzene. 53 parts of 3-(4-methylphenyl)-5-(1,3'-diazacyclohept-2'-enyl)-oxdiazole-(1,2,4) is obtained having a melting point of 164° to 165° C. The yield is equivalent to 83% of the theory.

We claim:
1. A process for the production of 5-(1',3'-diazacycloalk-2'-enyl)-oxdiazole-(1,2,4) having the formula:

(I)

where $R^1$ is alkyl of one to six carbon atoms, cycloalkyl of three to eight carbon atoms, benzyl, phenyl, naphthyl, phenyl substituted by chlorine or alkyl of one to four carbon atoms or alkoxy of one to four carbon atoms, naphthyl substituted by chlorine or alkyl of one to four carbon atoms or alkoxy of one to four carbon atoms, or the radical

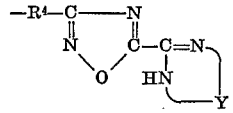

in which $R^4$ is alkylene of two to eight carbon atoms, Y is the radical

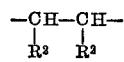

the radical

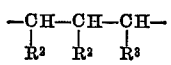

or the radical

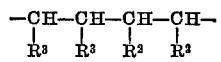

the individual radicals $R^2$ and $R^3$ each being hydrogen or alkyl of one to three carbon atoms, and where two radicals $R^2$ or two radicals $R^3$ are taken together with the two adjacent carbon atoms, further forming a five-membered or six-membered cycloalkyl ring, which process comprises reacting a 5-halomethyloxdiazole-(1,2,4 having the formula:

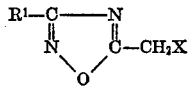

in which $R^1$ has the above meanings and X denotes bromine, iodine or chlorine with elementary sulfur and with a diaminoalkane having the formula:

$$H_2N-Y-NH_2 \qquad (III)$$

in which Y has the above meanings at a temperature of from 40° to 160° C.

2. A process as claimed in claim 1 carried out at a temperature of from 60° to 120° C.

3. A process as claimed in claim 1 carried out in the presence of an organic solvent which is inert under the reaction conditions in a ratio of from 3 to 20 moles of solvent per mole of starting material (II).

4. A compound of the formula

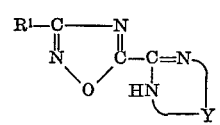

wherein $R^1$ is alkyl of one to six carbon atoms, cycloalkyl of three to eight carbon atoms, benzyl, phenyl, naphthyl, phenyl substituted by chlorine or alkyl of one to four carbon atoms or alkoxy of one to four carbon atoms, naphthyl substituted by chlorine or alkyl of one to four carbon atoms or alkoxy of one to four carbon atoms, or the radical:

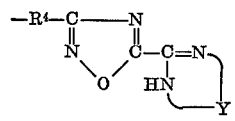

in which $R^4$ is alkylene of two to eight carbon atoms, Y is the radical

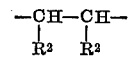

the radical

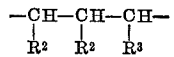

or the radical

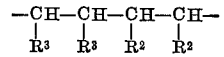

the individual radicals $R^2$ and $R^3$ each being hydrogen or alkyl of one to three carbon atoms, and where two radicals $R^2$ or two radicals $R^3$ are taken together with the two adjacent carbon atoms, further forming a five-membered or six-membered cycloalkyl ring.

References Cited
UNITED STATES PATENTS 3,578,666   5/1971   Manning _____ 260—256.5

ALEX MAZEL, Primary Examiner

R. V. RUSH, Assistant Examiner

U.S. Cl. X.R.

260—857 R, 860, 307 G, 999

UNITED STATES PATENT OFFICE
CERTIFICATE OF CORRECTION

Patent No. 3,776,910   Dated December 4, 1973

Inventor(s) Helmut Hagen et al

It is certified that error appears in the above-identified patent and that said Letters Patent are hereby corrected as shown below:

Column 1, line 8, insert
-- [30] Foreign Application Priority Data
April 8, 1970    Germany . . . . P20 16 692.1 --.

Column 1, line 15;
Column 1, line 17;
Column 1, line 25;
Column 1, line 30;
Column 1, line 32;
Column 4, line 54;
Column 4, line 68;
Column 5, line 60;
Column 7, line 60;
Column 7, line 74;
Column 8, line 14; and
Column 8, line 59: "-oxidazoles" should read -- oxdiazoles --.

Column 2, line 29, "related" should read -- reacted --.

Column 2, line 29, "(II)", 2nd occ. should read -- (III) -- .

Column 4, line 10, "-3-" should read -- -2- --.

Column 4, line 49;
Column 4, line 63;
Column 5, lines 2-3;
Column 7, line 50;
Column 7, line 70;
Column 8, line 9;
Column 8, line 23; and
Column 8, line 56: "-5-chloromethyloxidazole-" should read
-- -5-chloromethyloxdiazole- --.

UNITED STATES PATENT OFFICE
CERTIFICATE OF CORRECTION

Patent No. 3,776,910          Dated December 4, 1973

Inventor(s) Helmut Hagen et al

It is certified that error appears in the above-identified patent and that said Letters Patent are hereby corrected as shown below:

Column 4, line 53, "-(2-imidazolnyl)-" should read -- -(2-imidazolinyl)- --.

Column 5, line 45, "1,2-diaminepropane" should read -- 1,2-diaminopropane --.

Column 7, line 7 "83°" should read -- 183° --.

Column 8, lines 37-38, "-4-chloromethyloxidazole-" should read -- -5-chloromethyloxdiazole --.

Column 9, line 31, "-(1,2,4" should read -- -(1,2,4) --.

Signed and sealed this 8th day of October 1974.

(SEAL)
Attest:

McCOY M. GIBSON JR.
Attesting Officer

C. MARSHALL DANN
Commissioner of Patents